(12) United States Patent
Ono et al.

(10) Patent No.: US 11,204,517 B2
(45) Date of Patent: Dec. 21, 2021

(54) DISPLAY DEVICE

(71) Applicant: MITSUBISHI ELECTRIC CORPORATION, Tokyo (JP)

(72) Inventors: Yoshihiro Ono, Tokyo (JP); Yujiro Abe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/266,322

(22) PCT Filed: Sep. 5, 2018

(86) PCT No.: PCT/JP2018/032859
§ 371 (c)(1),
(2) Date: Feb. 5, 2021

(87) PCT Pub. No.: WO2020/049651
PCT Pub. Date: Mar. 12, 2020

(65) Prior Publication Data
US 2021/0311347 A1 Oct. 7, 2021

(51) Int. Cl.
*G02F 1/1333* (2006.01)
*G06F 3/041* (2006.01)

(52) U.S. Cl.
CPC .... *G02F 1/133322* (2021.01); *G02F 1/13338* (2013.01); *G06F 3/0412* (2013.01)

(58) Field of Classification Search
CPC ........... G02F 1/133322; G02F 1/13338; G06F 3/0412

USPC ...................................................... 349/58–60
See application file for complete search history.

(56) References Cited

U.S. PATENT DOCUMENTS

2010/0061040 A1* 3/2010 Dabov .................. G06F 1/1656
361/679.01

FOREIGN PATENT DOCUMENTS

JP 2009-282434 A 12/2009

* cited by examiner

*Primary Examiner* — Charles S Chang
(74) *Attorney, Agent, or Firm* — Birch, Stewart, Kolasch & Birch, LLP

(57) ABSTRACT

A display device includes: a liquid crystal panel which is integrated with a touch panel by bonding to the rear face of the touch panel; a panel which is provided behind the liquid crystal panel, and to which the touch panel is attached; a bracket which is provided between the panel and a holder that is provided behind the panel; a post which projects from the rear face of the liquid crystal panel in the rear direction; a through-hole which is formed in the panel in such a way as to allow the post to pass through the through-hole, and which has a hole diameter that is larger than the outer diameter of the post; and a through-hole which is formed in the bracket in such a way as to allow a screw fastened to the post, to pass through the through-hole, and which has a hole diameter that is larger than the screw diameter of the screw and smaller than the outer diameter of the post.

2 Claims, 5 Drawing Sheets

DISPLAY DEVICE

TECHNICAL FIELD

The present invention relates to a display device which includes a touch panel and a liquid crystal panel that are integrated with each other by bonding.

BACKGROUND ART

In recent years, as display devices for small-size electronic information apparatuses, in-vehicle electronic apparatuses and the like, there have been provided many devices each of which includes a touch panel and a liquid crystal panel that are integrated by bonding. When such a configuration is employed, it is possible to eliminate an air layer between the touch panel and the liquid crystal panel. Thus, the display device has an advantage that an image displayed thereon can be seen clearly.

Further, in the aforementioned conventional display device, the touch panel is adhered using a double-coated tape to a panel that is provided behind the touch panel, while the liquid crystal panel is attached to another member. Thus, in the conventional display device, variation in the attachment dimension when the touch panel and the liquid crystal panel are bonded together cannot be absorbed.

When the variation in the attachment dimension cannot be absorbed as described above, the liquid crystal panel is subjected to a load due to the variation in the attachment dimension. As a result, the conventional display device has a risk of causing display failure of the liquid crystal panel, peeling between the touch panel and the liquid crystal panel, or the like.

A display device in which a liquid crystal panel is attached to another member is disclosed, for example, in Patent Literature 1.

CITATION LIST

Patent Literature

Patent Literature 1: Japanese Patent Application Laid-open No. 2009-282434

SUMMARY OF INVENTION

Technical Problem

In the display device disclosed in Patent Literature 1, the liquid crystal panel is attached to another component by using screws. In such a conventional display device, if the liquid crystal panel and a touch panel are integrated by bonding, a problem may arise in that the variation in the attachment dimension in the right-left direction cannot be absorbed.

This invention has been made to solve the problem as described above, and an object thereof is to provide a display device which can absorb the variation in the attachment dimension in the right-left direction, the variation being caused when the touch panel and the liquid crystal panel are integrated by bonding.

Solution to Problem

A device according to the invention is characterized by comprising: a liquid crystal panel which is integrated with a touch panel by bonding to a rear face of the touch panel; a panel which is provided behind the liquid crystal panel, and to which the touch panel is attached; a bracket which is provided between the panel and a holder that is provided behind the panel; a post which projects from a rear face of the liquid crystal panel in a rear direction; a panel-side through-hole which is formed in the panel in such a way as to allow the post to pass through the panel-side through-hole, and which has a hole diameter that is larger than an outer diameter of the post; and a bracket-side through-hole which is formed in the bracket in such a way as to allow a first screw fastened to the post, to pass through the bracket-side through-hole, and which has a hole diameter that is larger than a screw diameter of the first screw and smaller than the outer diameter of the post.

Advantageous Effects of Invention

According to the invention, it is possible to absorb the variation in the attachment dimension in the right-left direction, the variation being caused when the touch panel and the liquid crystal panel are integrated by bonding.

DESCRIPTION OF EMBODIMENTS

Hereinafter, for illustrating the invention in more detail, an embodiment for carrying out the invention will be described with reference to the accompanying drawings.

Embodiment 1

Figure 2:
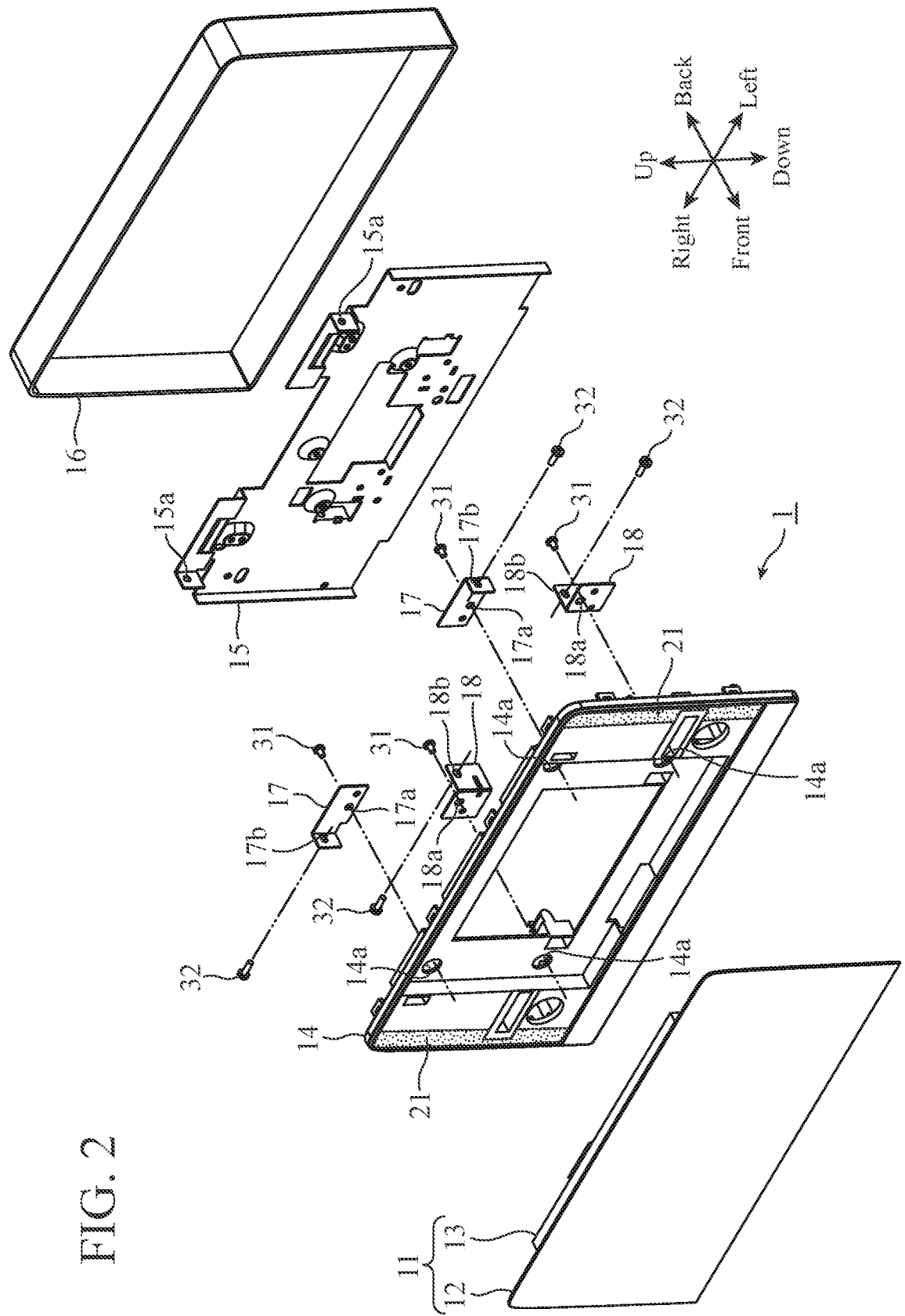
FIG. 2 is an exploded perspective view of the display device according to Embodiment 1, seen from the front side thereof.
Figure 3:
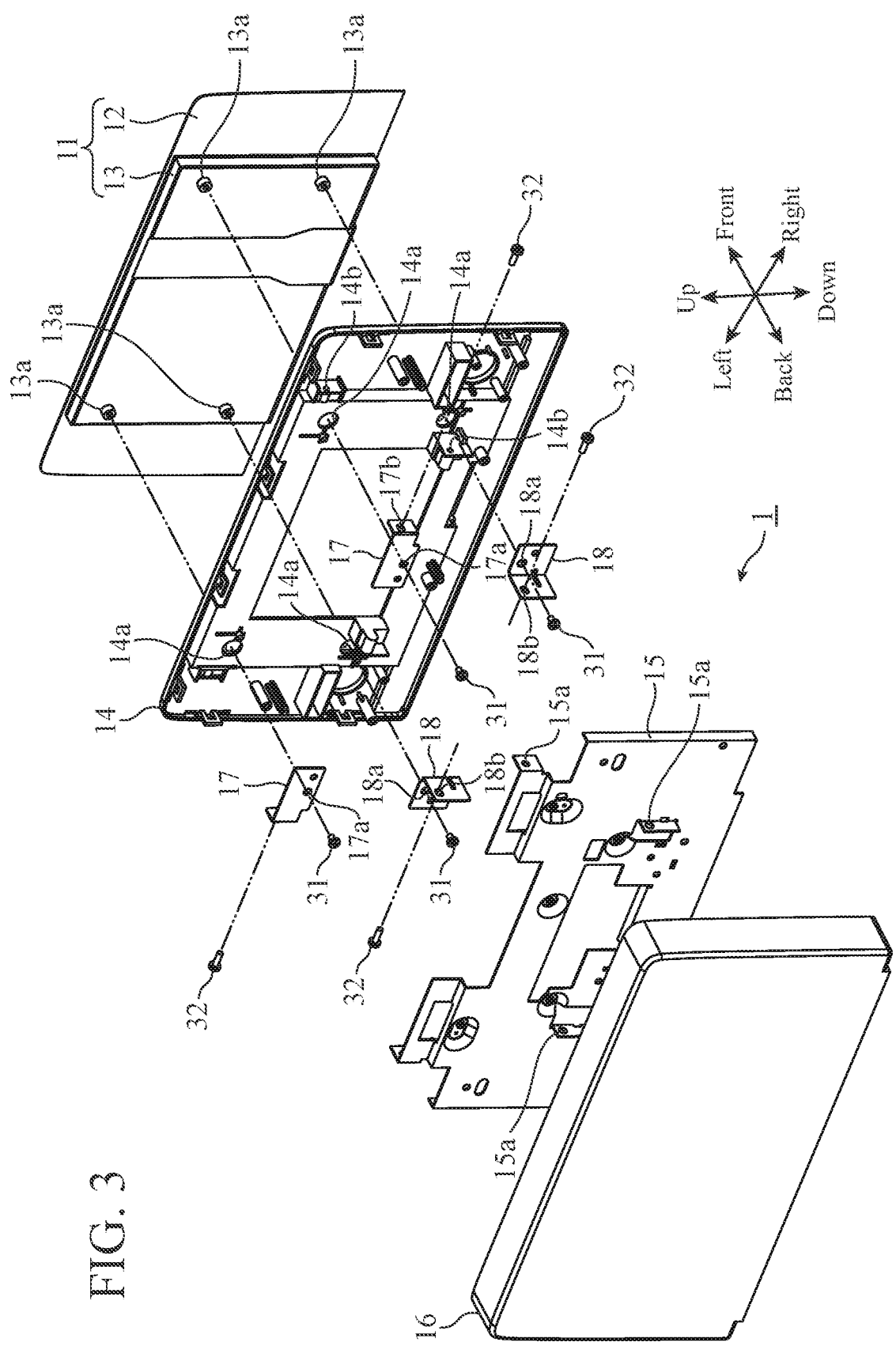
FIG. 3 is an exploded perspective view of the display device according to Embodiment 1, seen from the back side thereof.

First, using FIG. 1 to FIG. 3, the overall configuration of a display device 1 according to Embodiment 1 will be described in detail.

Figure 1:
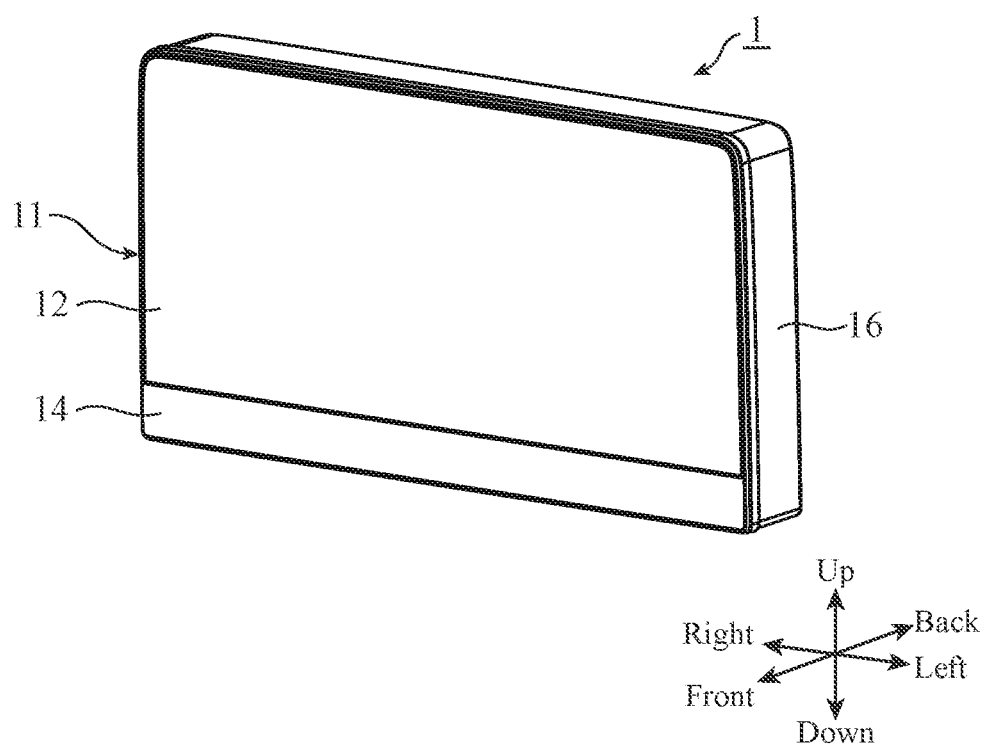
FIG. 1 is an external perspective view of a display device according to Embodiment 1.

FIG. 1 is an external perspective view of the display device 1 according to Embodiment 1. FIG. 2 is an exploded perspective view of the display device 1 according to Embodiment 1, seen from the front side thereof. FIG. 3 is a perspective view of the display device 1 according to Embodiment 1, seen from the back side thereof.

The display device 1 includes a touch panel 12, a liquid crystal panel 13, a panel 14, a holder 15, a rear-face panel 16 and brackets 17, 18. The touch panel 12, the liquid crystal panel 13, the panel 14, the holder 15 and the rear-face panel 16 are disposed in this order from the front-face side of the display device 1 to the rear-face side thereof.

The rear face of the touch panel 12 and the front face of the liquid crystal panel 13 are bonded to each other. In this manner, the touch panel 12 and the liquid crystal panel 13 are integrated by bonding, to constitute a module 11.

The rear face of the touch panel 12 is adhered using double-coated tapes 21 to the front face of the panel 14. The panel 14 is a resin member formed into a rectangular frame shape. Further, the rear face of the liquid crystal panel 13 closely faces an opening region formed into a frame shape in the panel 14.

The holder 15 is a member to which electronic components, board and the like are attached. These electronic components and board serve for operating the touch panel 12 and the liquid crystal panel 13. The rear-face panel 16 forms the side faces and rear face of the display device 1, and constitutes the housing of the display device 1. The front face of the holder 15 is attached to the rear face of the panel 14, and the rear face of the panel 14 is attached to the inner face of the rear-face panel 16.

The brackets 17, 18 are L-shaped sheet-metal members. These brackets 17, 18 are provided between the panel 14 and the holder 15. Further, although details will be described later, the brackets 17, 18 are fastened to the liquid crystal panel 13 by using screws 31. The panel 14 and the holder 15 are fastened together by screws 32 in a state in which the brackets 17, 18 are sandwiched between the panel 14 and the holder 15 from both sides in the thickness direction of these brackets. Note that the screws 31, 32 constitute first screws and second screws, respectively.

Here, as described above, the display device 1 includes the brackets 17, 18 of multiple types. The bracket 17 is provided on each of the upper right and left sides of the rear face of the panel 14. The bracket 18 is provided on each of the lower right and left sides of the rear face of the panel 14. However, the types and number of the brackets included in the display device 1 are not limited to these, and may be adjusted appropriately therefrom.

Next, using FIG. 2 to FIG. 6, detailed description will be made about an assembled structure for the module 11 in which the touch panel 12 and the liquid crystal panel 13 are integrated by bonding.

Figure 4:
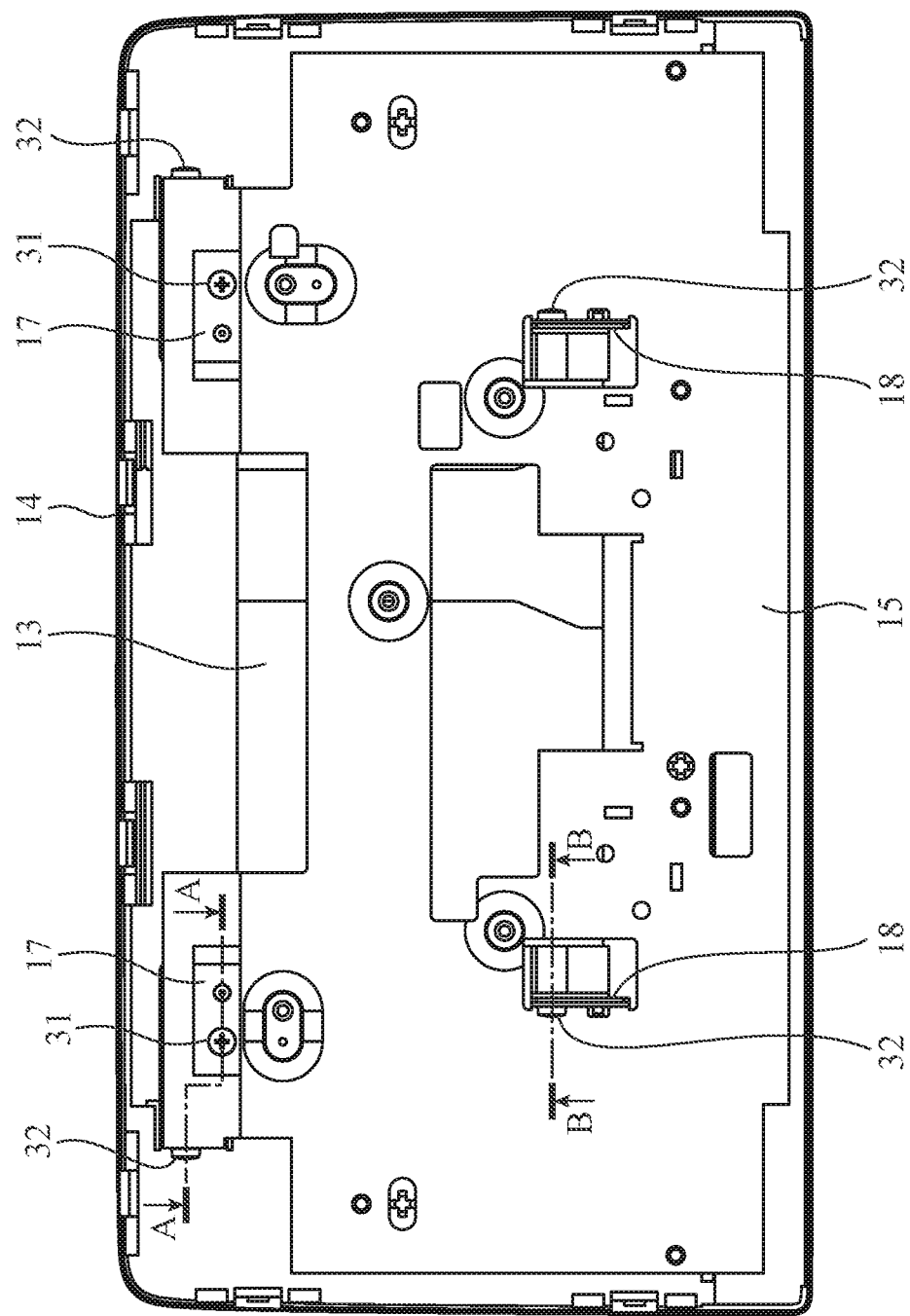
FIG. 4 is a rear view of the display device according to Embodiment 1, seen from the rear-face side of its holder.
Figure 5:
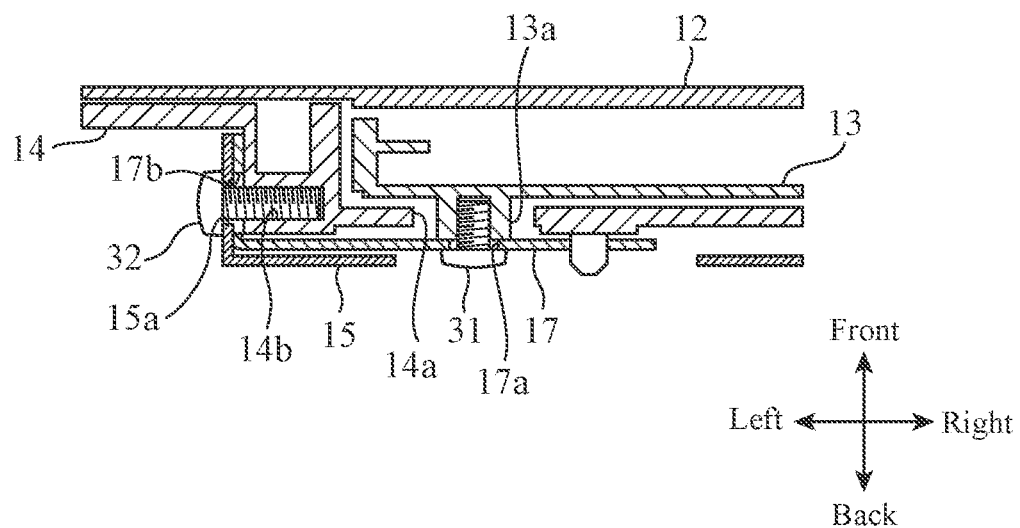
FIG. 5 is a cross-sectional arrow view taken along the line A-A in FIG. 4.
Figure 6:
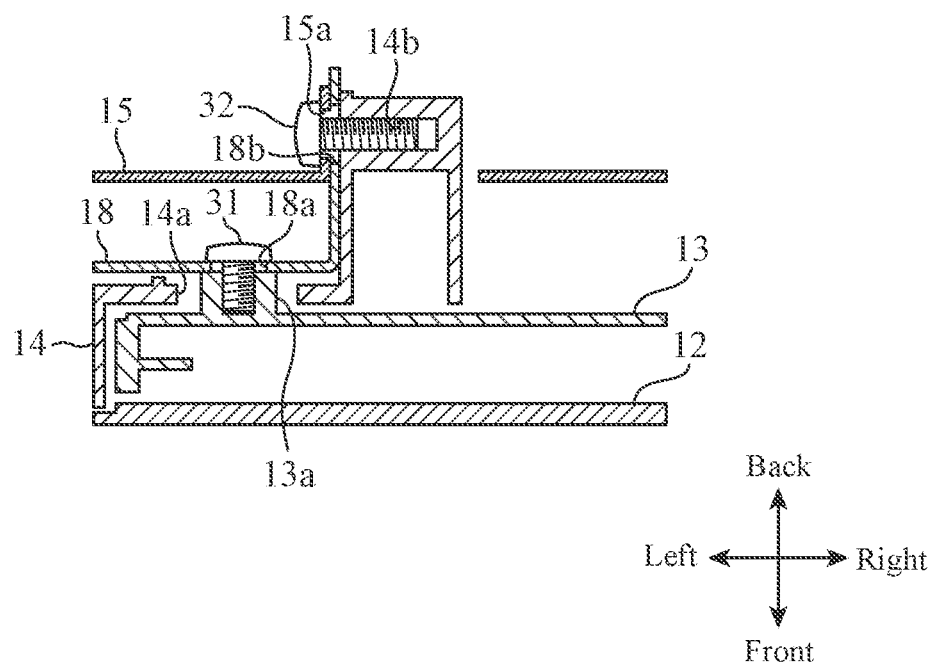
FIG. 6 is a cross-sectional arrow view taken along the line B-B in FIG. 4.

FIG. 4 is a rear view of the display device according to Embodiment 1, seen from the rear-face side of the holder. FIG. 5 is a cross-sectional arrow view taken along the line A-A in FIG. 4. FIG. 6 is a cross-sectional arrow view taken along the line B-B in FIG. 4.

The liquid crystal panel 13 has multiple posts 13a. These posts 13a project from the rear face of the liquid crystal panel 13 toward the backside of the display device 1. Further, the posts 13a are each formed into a cylindrical shape, and a screw hole is formed inside the post 13a in such a way as to extend in the front-back direction of the display device 1. The screw 31 can be fastened to the screw hole from the back side of the display device 1 toward the front side thereof. Namely, the axis of the screw 31 fastened to the post 13a extends in the front-back direction of the display device 1, that is, the thickness direction of the module 11.

The panel 14 has multiple through-holes 14a each given as a panel-side through-hole. These through-holes 14a are holes that penetrate the panel 14 in the front-back direction of the display device 1. The hole diameter of each of the through-holes 14a is larger than the outer diameter of the post 13a. Namely, the through-hole 14a is a clearance hole for the post 13a. The post 13a passes through the through-hole 14a from the front side of the display device 1 toward the back side thereof. Furthermore, the end face of the post 13a is closer to the back side of the display device 1 than the through-hole 14a.

The bracket 17 has a through-hole 17a given as a bracket-side through-hole. The through-hole 17a is a hole that penetrates the bracket 17 in the front-back direction of the display device 1. The hole diameter of the through-hole 17a is larger than the screw diameter of the screw 31 and smaller than the outer diameter of the post 13a. Namely, although the through-hole 17a is a clearance hole for the screw 31, the through-hole 17a doesn't allow the post 13a to pass therethrough.

The screw 31 is fastened to the screw hole in the post 13a while passing through the through-hole 17a from the backside of the display device 1 toward the front side thereof. At the time of fastening, the screw 31 is screwed until the head thereof abuts on a surface of the bracket 17 and the opposite surface of the bracket 17 abuts on the end face of the post 13a. When the screw 31 is thus fastened through the through-hole 17a to the post 13a projecting from the through-hole 14a, the position of the bracket 17 is determined in the front-back direction of the display device 1.

On the other hand, the bracket 18 has a through-hole 18a given as the bracket-side through-hole. The through-hole 18a is a hole that penetrates the bracket 18 in the front-back direction of the display device 1. The hole diameter of the through-hole 18a is larger than the screw diameter of the screw 31 and smaller than the outer diameter of the post 13a. Namely, although the through-hole 18a is a clearance hole for the screw 31, the through-hole 18a doesn't allow the post 13a to pass therethrough.

The screw 31 is fastened to the screw hole in the post 13a while passing through the through-hole 18a from the backside of the display device 1 toward the front side thereof. At the time of fastening, the screw 31 is screwed until its head abuts on a surface of the bracket 18 and the opposite surface of the bracket 18 abuts on the end face of the post 13a. When the screw 31 is thus fastened through the through-hole 18a to the post 13a projecting from the through-hole 14a, the position of the bracket 18 is determined in the front-back direction of the display device 1.

Accordingly, when variation in the attachment dimension of the module 11 in the right-left direction has occurred, the posts 13a of the liquid crystal panel 13 are allowed to be displaced within the through-holes 14a of the panel 14 in the right-left direction of the display device 1. Further, the screws 31 fastened to these posts 13a are allowed to be displaced within the through-holes 17a, 18a of the brackets 17, 18 in the right-left direction of the display device 1. Therefore, the display device 1 can absorb the variation in the attachment dimension of the module 11 in the right-left direction. Note that the attachment dimension of the module 11 in the right-left direction corresponds to a relative position of the liquid crystal panel 13 with respect to the touch panel 12 in the right-left direction.

Furthermore, the panel 14 has multiple screw holes 14b each given as a panel-side screw hole. Each of the screw holes 14b is formed to extend in the right-left direction of the display device 1. The screw 32 can be fastened to the screw hole 14b from the lateral side of the display device 1 toward the inside thereof. Namely, the axis of the screw 32 fastened to the screw hole 14b extends in the right-left direction of the display device 1, that is, a direction perpendicular to the axis of the screw 31. Note that the direction perpendicular to the axis of the screw 31 includes a direction nearly perpendicular to the axis of the screw 31.

The holder 15 has multiple through-holes 15a each given as a holder-side through-hole. These through-holes 15a are holes that penetrate the holder 15 in the right-left direction of the display device 1. The hole diameter of each of the through-holes 15a is larger than the screw diameter of the screw 32. Namely, the through-hole 15a is a clearance hole for the screw 32.

The bracket 17 has an oblong through-hole 17b given as a bracket-side oblong through-hole. The oblong through-hole 17b is an oblong hole that penetrates the bracket 17 in the right-left direction of the display device 1. Specifically, the oblong through-hole 17b is an oblong hole which extends in the front-back direction of the display device 1, that is, an oblong hole which extends in the thickness direction of the module 11. The length and the width of the oblong through-hole 17b are larger than the screw diameter of the screw 32. Namely, the oblong through-hole 17b is a clearance hole for the screw 32.

The screw 32 is fastened to the screw hole 14b while passing through the through-hole 15a and the oblong through-hole 17b from the lateral side of the display device 1 toward the inside thereof. At the time of fastening, the screw 32 is turned to fasten the panel 14, the holder 15 and the bracket 17 together until the head of the screw abuts on a surface of the holder 15 and these members are overlaid with each other in the right-left direction of the display device 1.

On the other hand, the bracket 18 has an oblong through-hole 18b given as the bracket-side oblong through-hole. The oblong through-hole 18b is an oblong hole that penetrates the bracket 18 in the right-left direction of the display device 1. Specifically, the oblong through-hole 18b is an oblong hole which extends in the front-back direction of the display device 1, that is, an oblong hole which extends in the thickness direction of the module 11. The length and the width of the oblong through-hole 18b are larger than the screw diameter of the screw 32. Namely, the oblong through-hole 18b is a clearance hole for the screw 32.

The screw 32 is fastened to the screw hole 14b while passing through the through-hole 15a and the oblong through-hole 18b from the lateral side of the display device 1 toward the inside thereof. At the time of fastening, the screw 32 is turned to fasten the panel 14, the holder 15 and the bracket 18 together until the head of the screw abuts on a surface of the holder 15 and these members are overlaid with each other in the right-left direction of the display device 1.

It is noted that, in the above assembled structure, the screw holes 14b, the through-holes 15a and the oblong through-holes 17b, 18b are holes that penetrate in the right-left direction of the display device 1; however, the positions of these holes may be changed appropriately so long as they are holes that penetrate in a direction perpendicular to the axis of the screw 31. For example, the screw holes 14b, the through-holes 15a and the oblong through-holes 17b, 18b may instead be holes that penetrate in the up-down direction of the display device 1. Further, in the above assembled structure, the oblong through-holes 17b, 18b are oblong holes that extend in the front-back direction of the display device 1; however, they may instead be circular holes so long as they have inner diameters equal to or larger than the respective lengths of the oblong through-holes 17b, 18b.

Accordingly, when variation in the attachment dimension of the module 11 in the front-back direction has occurred, the oblong through-holes 17b, 18b of the brackets 17, 18 are allowed to be displaced in the front-back direction of the display device 1 while keeping the screws 32, which are fastened to the panel 14, passing through the oblong through-holes 17b, 18b. Further, the through-holes 15a of the holder 15 are allowed to be displaced in the front-back direction of the display device 1 while keeping the screws 32, which are fastened to the panel 14, passing through the through-holes 15a. Therefore, the display device 1 can absorb the variation in the attachment dimension of the module 11 in the front-back direction. Note that the attachment dimension of the module 11 in the front-back direction corresponds to a thickness from the front face of the touch panel 12 to the end face of the post 13a in the liquid crystal panel 13.

As described above, the display device 1 according to Embodiment 1 includes: the liquid crystal panel 13 which is integrated with the touch panel 12 by bonding to the rear face of the touch panel; the panel 14 which is provided behind the liquid crystal panel 13, and to which the touch panel 12 is attached; the brackets 17, 18 which are provided between the panel 14 and the holder 15 that is provided behind the panel 14; the posts 13a which project from the rear face of the liquid crystal panel 13 in the rear direction; the through-holes 14a which are formed in the panel 14 in such a way as to allow the posts 13a to pass through the through-holes 14a, and each of which has a hole diameter that is larger than the outer diameter of the corresponding post 13a; and the through-holes 17a, 18a which are respectively formed in the brackets 17, 18 in such a way as to allow the screws 31 fastened to the posts 13a, to pass through the through-holes 17a, 18a, and each of which has a hole diameter that is larger than the screw diameter of the corresponding screw 31 and smaller than the outer diameter of the corresponding post 13a. Accordingly, the display device 1 can absorb the variation in the attachment dimension of the module 11 in the right-left direction.

Further, the display device 1 includes: the screw holes 14b which are formed in the panel 14, and to which the screws 32 are fastened from a direction perpendicular to the axes of the screws 31; the through-holes 15a which are formed in the holder 15 in such a way as to allow the screws 32 fastened to the screw holes 14b, to pass through the through-holes 15a, and each of which has a hole diameter that is larger than the screw diameter of the corresponding screw 32; and the oblong through-holes 17b, 18b which are respectively formed in the brackets 17, 18 in such a way as to allow the screws 32 fastened to the screw holes 14b, to pass through the oblong through-holes 17b, 18b, and which extend in the thickness direction of the touch panel 12 and the liquid crystal panel 13. Accordingly, the display device 1 can absorb the variation in the attachment dimension of the module 11 in the front-back direction.

As aforementioned, the display device 1 can absorb the variation in the attachment dimensions of the module 11 in the right-left direction and in the front-back direction, so that a load due to such variation in the attachment dimensions is not imposed on the liquid crystal panel 13. As a result, the display device 1 can prevent display failure, such as moire or the like on the liquid crystal panel 13, and occurrence of peeling between the touch panel 12 and the liquid crystal panel 13.

Furthermore, even in the case where the touch panel 12 and the panel 14 are adhered to each other only using the double-coated tapes 21, the display device 1 can hold the module 11 with a high holding force, while absorbing the variation in the attachment dimensions of the module 11 in the right-left direction and in the front-back direction. This is because the posts 13a of the liquid crystal panel 13 that constitutes, together with the touch panel 12, the module 11, are fastened through the brackets 17, 18 to the panel 14 by means of the screws 31.

In addition, in the display device 1, the variation in the attachment dimension of the module 11 in the front-back direction can be absorbed by only the provision of the brackets 17, 18 between the panel 14 and the holder 15.

Thus, the panel 14 and the holder 15 can be easily and firmly fixed to each other by only use of the screws 32. At this time, the screws 32 impose no load on the liquid crystal panel 13 because they merely fasten the panel 14, the holder 15 and the brackets 17, 18 together.

It should be noted that modification of any component in the embodiment and omission of any component in the embodiment may be made, without departing from the scope of the invention.

INDUSTRIAL APPLICABILITY

The display device according to this invention includes: the post which projects from the rear face of the liquid crystal panel in the rear direction; the panel-side through-hole which has a hole diameter larger than the outer diameter of the post; and the bracket-side through-hole which has a hole diameter that is larger than the screw diameter of the first screw and smaller than the outer diameter of the post. Thereby, the display device can absorb the variation in the attachment dimension in the right-left direction, the variation being caused when the touch panel and the liquid crystal panel are integrated by bonding. Thus, the display device is suited for use as a display device or the like which includes a touch panel and a liquid crystal panel that are integrated by bonding.

REFERENCE SIGNS LIST

1: display device, 11: module, 12: touch panel, 13: liquid crystal panel, 13a: post, 14: panel, 14a: through-hole, 14b: screw hole, 15: holder, 15a: through-hole, 16: rear-face panel, 17, 18: bracket, 17a, 18a: through-hole, 17b, 18b: oblong through-hole, 21: double-coated tape, 31, 32: screw.

The invention claimed is:

1. A display device, comprising:
   a liquid crystal panel which is integrated with a touch panel by bonding to a rear face of the touch panel;
   a panel which is provided behind the liquid crystal panel, and to which the touch panel is attached;
   a bracket which is provided between the panel and a holder that is provided behind the panel;
   a post which projects from a rear face of the liquid crystal panel in a rear direction;
   a panel-side through-hole which is formed in the panel in such a way as to allow the post to pass through the panel-side through-hole, and which has a hole diameter that is larger than an outer diameter of the post; and
   a bracket-side through-hole which is formed in the bracket in such a way as to allow a first screw fastened to the post, to pass through the bracket-side through-hole, and which has a hole diameter that is larger than a screw diameter of the first screw and smaller than the outer diameter of the post.

2. The display device of claim 1, further comprising:
   a panel-side screw hole which is formed in the panel, and to which a second screw is fastened from a direction perpendicular to an axis of the first screw;
   a holder-side through-hole which is formed in the holder in such a way as to allow the second screw fastened to the panel-side screw hole, to pass through the holder-side through-hole, and which has a hole diameter that is larger than a screw diameter of the second screw; and
   a bracket-side oblong through-hole which is formed in the bracket in such a way as to allow the second screw fastened to the panel-side screw hole, to pass through the bracket-side oblong through-hole, and which extends in a thickness direction of the touch panel and the liquid crystal panel.

* * * * *